Figure 4:
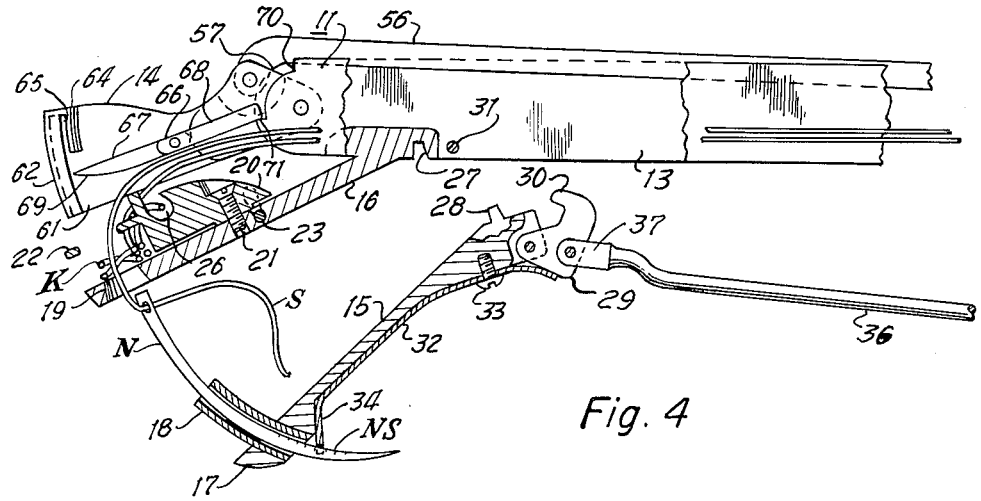

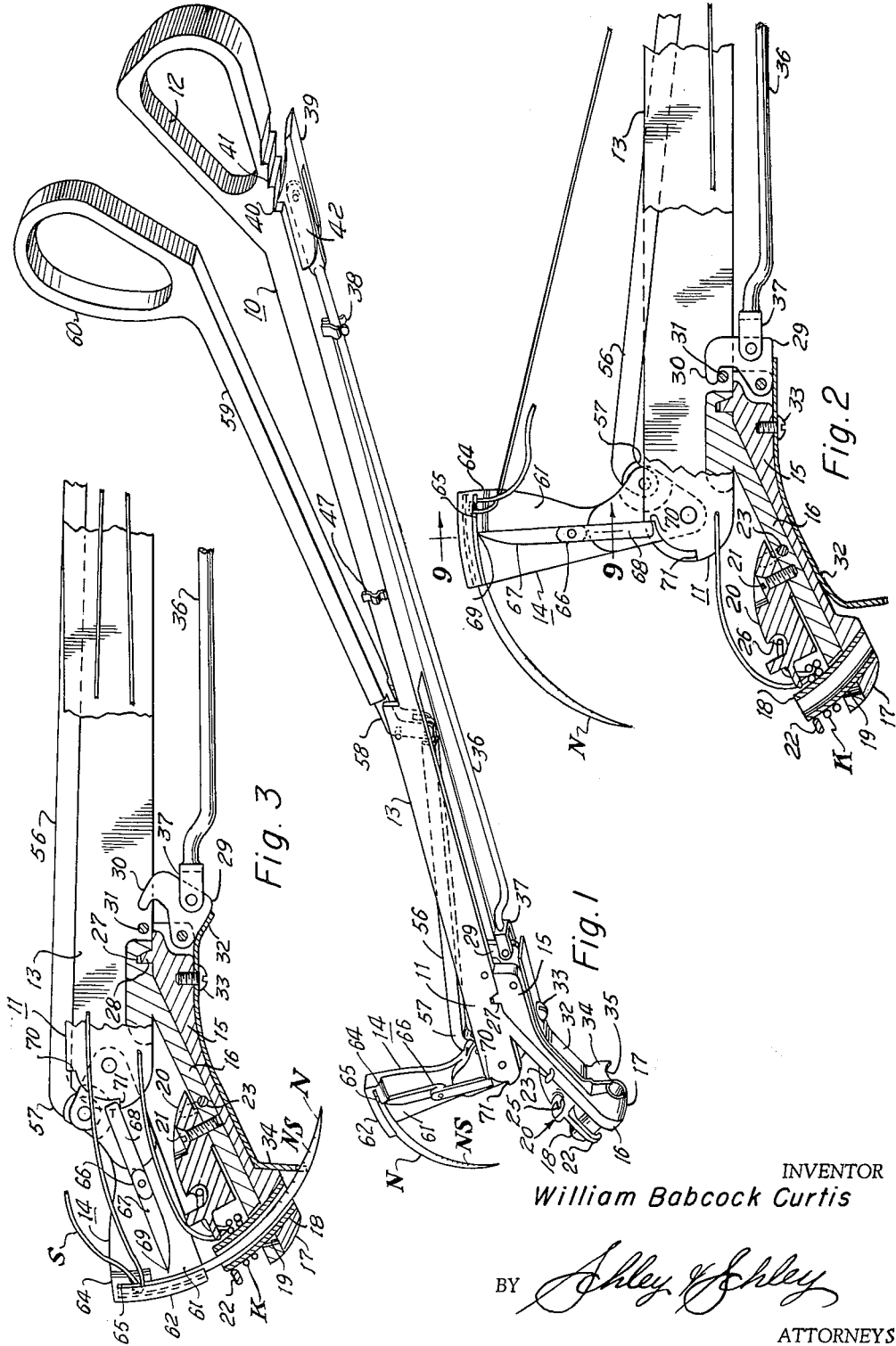

INVENTOR
William Babcock Curtis

BY Ahley & Ahley

ATTORNEYS

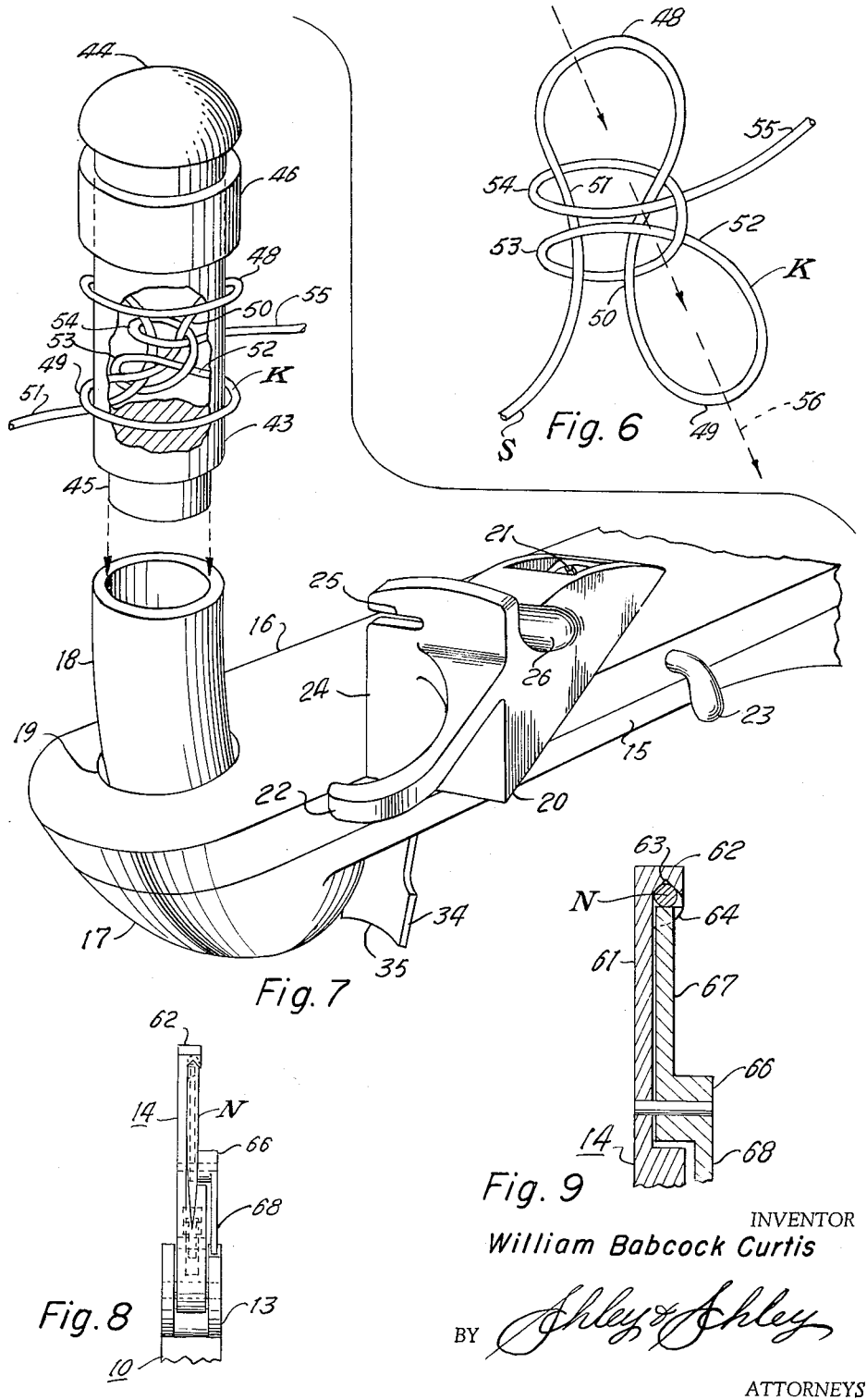

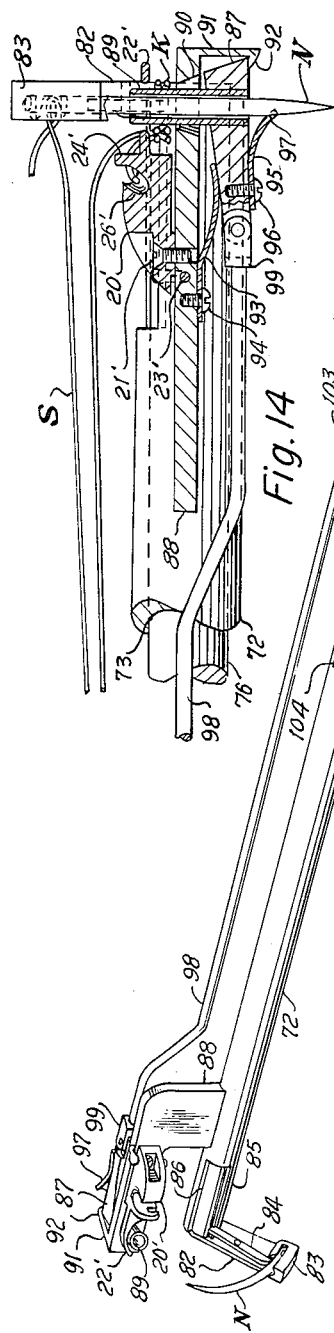

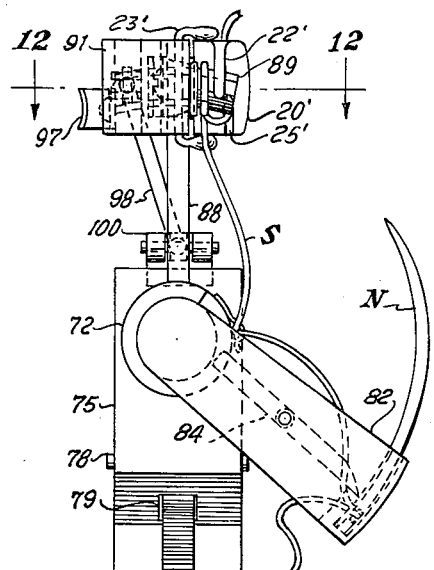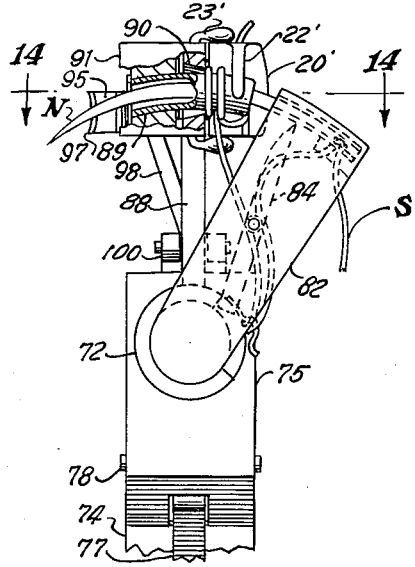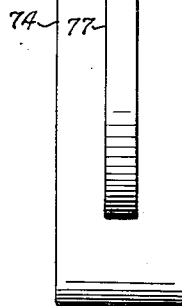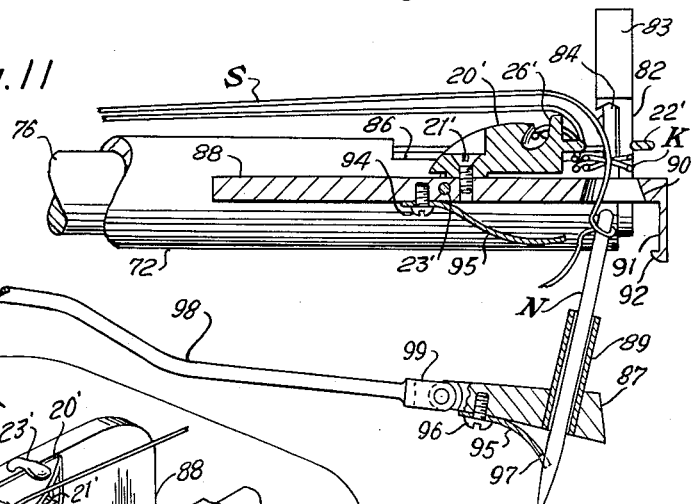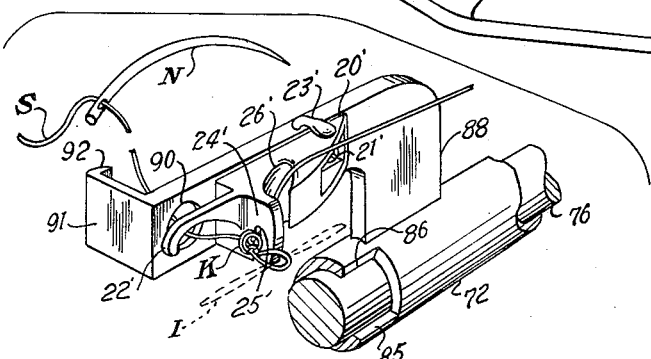

United States Patent Office 3,090,386
Patented May 21, 1963

3,090,386
SURGICAL SUTURING INSTRUMENT
William Babcock Curtis, Dallas, Tex., assignor to Curtis-Scott Company, Dallas, Tex., a partnership
Filed July 20, 1961, Ser. No. 125,531
20 Claims. (Cl. 128—334)

This invention relates to new and useful improvements in surgical suturing instruments.

One object of the invention is to provide an improved surgical suturing instrument of such construction that a suture can be passed through margins of an incision or wound and tied without applying undesirable tension thereto.

Another object of the invention is to provide an improved surgical suturing instrument having means for supporting the pre-tied knot of a suture contiguous an incision or wound so as to receive the suture immediately after it passes through the edges of the incision or wound and permit the desired application of tension to said suture and tightening of said knot without changing such tension.

A particular object of the invention is to provide an improved surgical suturing instrument, of the character described, having means for preventing displacement of the pre-tied knot of the suture and for supporting said knot during tightening thereof so as to prevent the application of excessive tension to said suture.

An important object of the invention is to provide an improved surgical suturing instrument wherein the suture passes through the incision or wound in one direction only upon each stitch and wherein the movement of said suture may be about the axis of the instrument or transverse thereto to permit use thereof in different types and locations of incisions or wounds.

A further object of the invention is to provide an improved instrument, of the character described, having needle extracting means associated with the knot supporting means for pulling a needle and its suture through the incision or wound and the pre-tied knot of the suture and for withdrawing said supporting means to permit tensioning of said suture and tightening of said knot.

Another object of the invention is to provide an improved instrument, of the character described, having novel means for releasably holding and passing a needle through an incision or wound and the pre-tied knot of the suture into engagement with the needle extracting means whereupon the needle is disengaged from the holding means and pulled through the incision or wound and said knot by said extracting means.

A specific object of the invention is to provide an improved pre-tied knot for a surgical suture which will not slip and which can be tightened by being pulled in one direction against a stop without excessive tensioning of the suture, together with novel means for positioning the pre-tied knot on the knot supporting means of a suturing instrument.

A construction designed to carry out the invention will be hereinafter described, together with other features of the invention.

Figure 5:
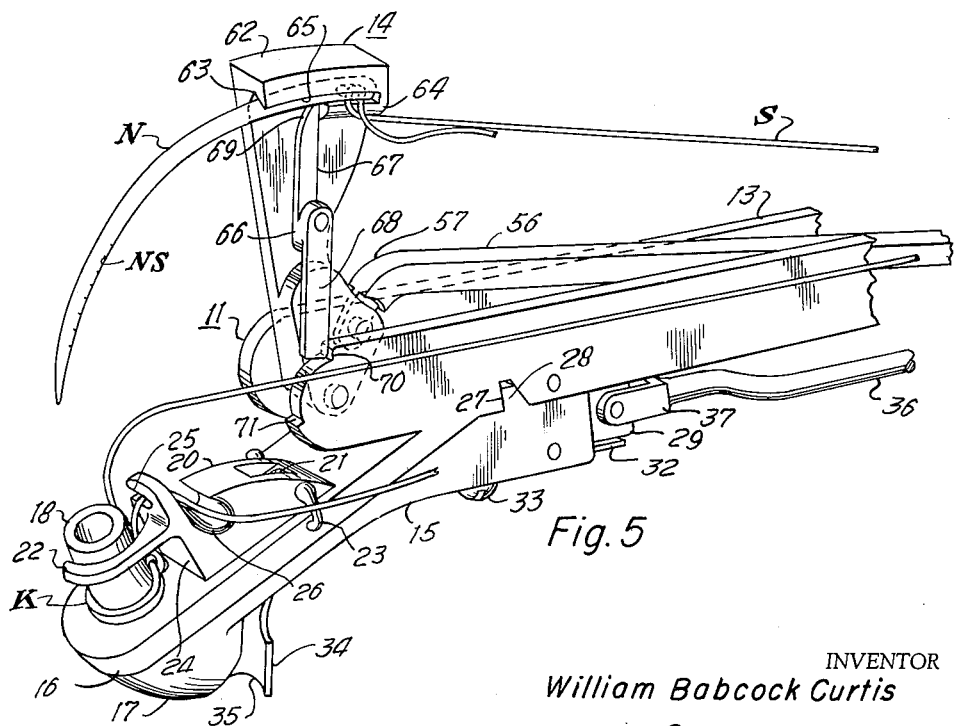

The invention will be more readily understood from a reading of the following specification and by reference to the accompanying drawings, wherein examples of the invention are shown, and wherein:

FIG. 1 is a perspective view of a surgical suturing instrument constructed in accordance with the invention, FIG. 2 is a side elevational view, partly in section, of the head of the instrument supporting the pre-tied knot of a suture and a surgical needle threaded on the suture preparatory to use, FIG. 3 is a view, similar to FIG. 2, showing the needle engaged with the needle extractor and released from its supporting arm, FIG. 4 is a view, similar to FIG. 2, showing the needle extractor released from the head and the withdrawal of the needle and suture through the pre-tied knot, FIG. 5 is a perspective view of the head of the instrument, FIG. 6 is a plan view of the pre-tied knot before it is placed on the instrument, FIG. 7 is an enlarged perspective view illustrating the positioning of the knot on the instrument, FIG. 8 is an end elevational view of the needle supporting arm, FIG. 9 is an enlarged, cross-sectional view, taken on the line 9—9 of FIG. 2, FIG. 10 is a perspective view, partly in section, of a modified instrument, FIG. 11 is an end elevational view of the modified instrument, having the needle and pre-tied knot supported thereon, FIG. 12 is a longitudinal, sectional view, taken on the line 12—12 of FIG. 11, FIG. 13 is a plan view, partly in section, of the head of the modified instrument showing the needle engaged with the needle extractor, FIG. 14 is a cross-sectional view, taken on the line 14—14 of FIG. 13.

FIG. 15 is a view, similar to 14, showing the needle extractor released from the head and the withdrawal of the needle and suture through the pre-tied knot, and, FIG. 16 is a fragmentary, perspective view of the head illustrating the tightening of the knot.

In the drawings, the numeral 10 designates the elongate body of a surgical suturing instrument having a head or front end portion 11 and a handle or rear end portion 12 of the usual scissors type. The head 11 is bifurcated and has a pair of parallel, long legs 13 which are of greater width than the handle portion 12. A needle holding member or arm 14 is pivotally mounted between the outer ends of the legs 13 to support a surgical needle N, threaded on a suture S, for passage through the edges of an incision or wound I (FIG. 16) and through a pre-tied knot K of the suture (FIGS. 1–5). For catching or receiving the needle N after it passes through the incision, a needle extractor 15 is detachably mounted on the legs and is supported by a flat arm or extension 16 which projects at an acute angle past the outer ends of said legs from a point inwardly of said outer ends. The outer end of the needle extractor 15 is enlarged to provide an annular boss 17 in which an arcuate tube 18 is mounted for projecting through an opening 19 in the arm 16 to receive the needle upon pivoting of the member 14. Preferably, the tube 18 is cylindrical and its outer end, which projects from the arm toward the pivotable member, is adapted to support the pre-tied knot K. Since the tube is withdrawn through the opening 19 upon detachment of the needle extractor, the knot is stripped from said tube onto the suture passing therethrough (FIG. 4).

The pre-tied knot is adapted to be confined on the tube 18 by a retaining element or fence 20 pivotally mounted on the arm 16 by a screw 21 and having a hook-like extension or finger 22 for engaging partly around the outer end portion of said tube. A U-shaped, rotatable latch pin 23 extends transversely through the arm and has its legs on opposite sides thereof for holding the fence 20 against movement. As shown in FIG. 7, the fence may be pivoted out of engagement with the tube when the latch legs are swung outwardly or downwardly. An enlarged, flat, perpendicular face 24, from which the finger 22 projects, is provided on the outer end of the fence 20 and has an elongated aperture or slot 25 extending transversely thereof for receiving the free end of the suture S adjacent the knot K. It is noted that the width of the slot is substantially equal to the diameter of the suture so that the knot cannot pass therethrough. A recess or sump 26 extends transversely of the fence adjacent its face 20 and is adapted to receive the suture from the slot 25.

The needle extractor 15 is angular and has its inner end portion overlying the legs 13 and the angular inner end portion of the arm 16 which is disposed between said legs. A notch or slot 27 extends transversely of the underlying margins of the legs and surface of the arm inner end portion to receive an ear or lug 28 on the inner portion of said extractor (FIGS. 4 and 5). Due to the engagement of the lugs 28 in the recesses 27 and the tube 18 in the opening 19 as well as the angularity of the extractor, relative rearward movement of said extractor is required to detach the same from the instrument. An angular or bell-crank latch 29 is pivotally attached to the inner or rear end of the extractor 15, adjacent its lug, and has a hook 30 for engaging over a pin 31 extending transversely between the legs of the head so as to hold said extractor in engagement with said legs and the arm 16.

The hook 30 is urged into engagement with the pin 31 by the inner end of a leaf spring 32 which overlies and is secured to the extractor by a screw 33. As shown by the numeral 34, the outer end of the spring is enlarged and bent outwardly upon itself to provide a catch adjacent the boss 17 for engagement by the tapered end of the needle N after it passes through the tube 18. Preferably, the catch 34 has an arcuately-recessed outer end 35 for contact with the concave surface of the needle and said surface may have slight indentations or serrations NS for coacting with the recessed end of said catch. The latter is spaced from the boss, as shown in FIGS. 1, 2, 5 and 7, but is pulled into engagement therewith (FIGS. 3 and 4) by relative rearward movement of the needle which is caused by the natural resistance to forward movement of said needle in stitching an incision or wound. Due to this engagement, the needle is forced transversely of the tube and wedged therein against displacement so as to be removed from the instrument upon detachment of the extractor.

For detaching the needle extractor 15, an elongated rod or lever 36 is pivotally connected to the latch 29 by a clevis 37 and extends longitudinally of the body 10 and its handle 12. The rod 36 terminates short of the outer end of the handle and is adapted to be attached thereto by a spring clip 38 on said handle (FIG. 1). A pawl-type latch 39 is pivoted on the outer end of the rod and has a pawl or tooth 40 for engaging one of a plurality of serrations or ratchet teeth 41 which are formed on the handle 12. As shown, the pawl 40 of the latch 39 engages the innermost tooth 41 and coacts with the clip 38 to prevent displacement of the rod 36 and pivoting of the latch 29 when the lug 28 of the extractor is engaged with the notch 27 of the legs 13 and arm 16. Upon counterclockwise pivoting of the latch 39, the pawl is disengaged from the handle tooth and the rod may be swung away from the instrument body to pivot the latch 29 outwardly and disengage its hook 30 from the pin 31 (FIG. 3). The rod 36 then may be moved rearwardly of the body to detach the extractor and withdraw the tube 18 from the opening 19.

As shown in FIG. 4, the withdrawal of the tube strips the pre-tied knot K therefrom and pulls the needle N and suture S through said knot as well as the opening. It is noted that more than one tooth 41 is provided on the handle in order to assist in detaching the extractor in the event that the tube 18 binds or hangs in the opening 19, the pawl 40 being engageable with one of the other teeth upon partial relative movement of the rod 36. Also, the inner portion of the latch inwardly of its pawl and pivotal connection to the rod is bifurcated to provide a pair of legs 42 for engaging the handle 12 upon clockwise pivoting of said latch to pry said rod away from said handle in the event that the extractor or tube sticks.

The pre-tied knot K is adapted to be positioned on the projecting end of the tube 18 by a cylindrical bobbin 43, of substantially the same diameter as said tube, having an enlarged head 44 on one end and a reduced pin 45 on its other end complementary to the bore of said tube (FIG. 7). A collar 46 is loosely mounted on the bobbin 43 for sliding the knot therefrom onto the tube. After the knot is tied on the bobbin between its pin 45 and collar 46, the fence 20 is pivoted to swing its hook 22 out of engagement with the tube and the pin is inserted in said tube so that said knot may be slid thereon by moving the collar longitudinally of said bobbin. Then, the hook of the fence is re-engaged with the tube to confine the knot thereon. Upon pulling of the needle N and suture S through the knot as shown in FIG. 4, said knot is adapted to be tightened against the face 24 of the fence 20 by pulling the portion of the suture which extends through the slot 25 and recess 26 of said fence. Due to the small width of the slot, the knot is prevented from passing therethrough. It is noted that the size of the stitch through the edges of the incision or wound I is controlled by pulling the other end of the suture which is threaded in the needle and that tightening of the knot does not decrease said stitch size and apply undesired tension on said stitch and consequently the incision or wound. The portion of the suture between the needle and knot may be held out of the way by a spring clip 47 on the handle 12 of the body (FIG. 1).

Although the knot K is subject to variation, it is essential that said knot be capable of being tightened by pulling only one end thereof so that such tightening does not impart any tension to the portion of the suture which extends through the incision or wound. Also, of course, the knot must not slip. The preferred knot is shown in FIG. 6 and includes a pair of loops 48 and 49 which are adapted to surround the bobbin 43 and then the tube 18. A leg 50 is common to both loops and the loop 48 has a free leg 51 which connects the knot to the portion of the suture S that passes through the slot 25 and recess 26 of the fence 20. The loop 49 has its other leg 52 disposed in a loop 53 which passes under and then over the legs 50 and 51 and then over itself. A second loop 54 of the leg 52 extends from its loop 53, under and then over the legs 50 and 51, under the portion of said leg 52 between the loops 53 and 54, and then terminates in an end 55. The latter is connected to the main portion of the suture on which the needle is threaded. As shown by the broken arrows 56 in FIG. 6, the bobbin 43 as well as the needle and suture are adapted to pass through the loops 48 and 49 of the knot. After the knot is stripped from the tube, it is tightened on the suture by pulling the free leg 51. The loops 48 and 49 as well as the loops 53 and 54 tighten before any tension is placed on the end 55 of said loop 54 and coact to prevent slipping of the knot.

Although not illustrated, it is readily apparent that the needle N may be manipulated by a separate instrument, such as a forceps (not shown); however, the use of a separate instrument is not feasible internally of the body of the patient or in small, deep incisions. Accordingly, the instrument of this invention has more utility when the needle is mounted thereon by the needle holding member 14. For pivoting the member to drive the needle through the flesh, skin or tissue of the patient and into engagement with the tube 18 of the needle extractor 15, a link 56 is pivotally attached to the inner end portion of said member adjacent its pivotal connection to the legs 13 and extends rearwardly between said legs. The inner end portion of the member 14 is bifurcated or slotted to receive the offset front end 57 of the link 56, and the rear end of said link is pivotally connected to the angular, bifurcated front end 58 of an elongate member or lever 59 which is pivotally supported between the inner end portions of the legs. A scissors type handle 60, similar to the handle 12, is provided on the rear end of the lever 59 to receive the thumb when said handle 12 is gripped by the fingers of a surgeon's hand. Due to the angular front end 58 of the lever and its pivotal mounting, the link 56 is reciprocated forwardly of the instrument to pivot the member 14 toward the arm 16 when said lever is swung toward the body of said instrument.

As shown by the numeral 61, the major, intermediate portion of the needle holding member 14 is recessed to provide a lateral flange 62 on the outer margin of said member in spaced alinement with its inner portion (FIGS. 5 and 9). An arcuate channel or groove 63, triangular in cross-section, is formed in the inner surface or underside of the flange 62 for receiving the head of the needle N and has its rear end closed by an angular extension 64 of said flange. The angular extension 64 has a lateral portion in underlying, spaced relation to the flange for supporting the head of the needle and providing a slot 65 to accommodate the suture S threaded on said needle. A latch pin element 66, having parallel, offset end portions or legs 67 and 68, is pivotally mounted intermediate its ends on the recessed portion 61 of the member 14 with the leg 67 overlying said recessed portion and the leg 68 overlying the inner end portion of said member. As shown by the numeral 69, the outer end of the latch leg 67 is pointed or tapered for frictionally engaging the concave surface of the needle to prevent displacement thereof from the recess 63. A pair of shoulders or stops 70 and 71 are formed on the outer end of one of the legs 13, by arcuately recessing said end, for engagement by the end of the latch leg 68 to pivot the latch element and move its pointed end 69 into and out of engagement with the needle. When the member 14 is swung clockwise, the latch element 66 engages the stop 70 and is pivoted clockwise into engagement with the needle (FIGS. 1, 2 and 5) and said latch element engages the stop 71 and is pivoted counter-clockwise out of engagement with said needle when said member is swung counter-clockwise (FIGS. 3 and 4). It is noted that the needle and its holding member are mounted for pivotal movement about an axis which extends transversely of the longitudinal axis of the body 10 of the instrument. Also, it is pointed out that the needle holding member 14 is capable of being used with a different type of needle extractor or separately as an instrument for manipulating the needle.

A modified surgical suturing instrument is shown in FIGS. 10–16 and includes a tubular body 72 having a cylindrical bore 73. An angular handle 74, of the pistol-grip type, is mounted on the rear end of the body 72 and has an inner, upper, hollow portion 75 communicating with the bore 73 of said body (FIG. 10). The bore rotatably supports a complementary rod or cylindrical member 76 which is of greater length than the body and extends into the hollow portion 75 of the handle 74. For oscillating the rod 76 about its longitudinal axis, a trigger or lever element 77 is pivotally suspended from the handle by a transverse pin 78 and extends through an elongate opening or slot 79 in the underside of said handle. The trigger 77 has a finger opening 80 and is connected to the rod by a pair of short cables or wires 81 which are wrapped around said rod in opposite directions, whereby counter-clockwise pivoting of said trigger imparts counterclockwise rotation to said rod and the latter undergoes clockwise rotation upon clockwise pivotal movement of said trigger (FIG. 10).

A needle holding member or arm 82, substantially identical to the member 14, is mounted on the front end of the rod 76 so as to project laterally therefrom and from the body 72. With the exception of its flange 83, the member 82 is of constant thickness and its latch element or pin 84 is flat and has no offsets. For pivoting the latch element 84 into and out of frictional engagement with the needle N, the adjacent end portion of the body is recessed or slotted to provide shoulders or stops 85 and 86 which are similar to the stops 70 and 71 and which function in the same manner. Since the remainder of the member 82 is identical to the member 14, it is believed unnecessary to describe the same; however, said member 82 is pivotable about the longitudinal axis of the body of the instrument.

A needle extractor 87, similar to the extractor 15, is detachably mounted on one side of an angular arm or extension 88 which projects laterally from the front end of the body. The extractor 87 has a needle receiving tube 89, similar to the tube 18, extending through its outer end portion for projecting through an opening 90 extending transversely of the outer end portion of the arm 88 (FIGS. 12–15). A retaining element or fence 20' is pivotally mounted on the opposite side of the arm for retaining the pre-tied knot K of the suture S on the projecting end of the tube 89 and, being identical to the fence 20, the same primed numerals designate its corresponding parts. The arm 88 has a lateral flange 91 on its outer end for overlying the outer end of the extractor which is releasably confined by a lip 92 extending inwardly from the extremity of the flange. An arched or bowed leaf spring 93 is fastened to the arm by a screw 94 in underlying relation to the extractor 89 for urging said extractor into engagement with the lip 92. The extractor 89 has a similar spring 95 attached to its outer surface by a screw 96 in order to provide a catch 97, similar to the catch 34, for coacting with the tube and engagement by the tapered end of the needle (FIG. 13).

An elongate rod or lever 98, similar to the rod 36, is pivotally connected to the inner end of the extractor by a clevis 99 and extends longitudinally of the body 72. The rear end of the rod 98 is detachably fastened to the portion 75 of the handle 74 by a latch 100 which is similar to the latch 39 and which has a similar pawl or tooth 101 for engaging in a recess 102 formed in said handle portion. A spring clip 103, similar to the clip 38 is mounted on the front end of the handle for attaching the rod thereto and coacting with the latch. Upon counter-clockwise pivoting of the latch 100, its pawl 101 is disengaged from the recess 102 to permit movement of the rod away from the body to detach the extractor 89 from the lip 92 of the flange 91 and withdraw the tube 89 from the opening 90 of the arm 88 (FIG. 15). As shown in the latter view and as previously explained, the withdrawal of the tube strips the pre-tied knot K therefrom onto the suture S and pulls the needle N and suture through said knot as well as the opening. A spring clip 104, similar to the clip 47, may be mounted on the body 72 to hold the suture out of the way.

The tightening of the knot K is illustrated in FIG. 16 wherein the modified instrument is shown but which is applicable to both instruments. As has been explained, the size of the stitch through the incision I is determined by pulling the portion of the suture S which is threaded on the needle N and extends through the knot and the edges of said incision. Both the knot and the incision engage the face 24' of the fence 20' during tightening of said knot so that the desired tension is maintained on the stitch and its size is not enlarged. The knot is tightened by pulling the portion of the suture which extends through the slot 25' and recess 26' of the fence without placing any additional tension on the stitch due to the fact that said knot is tightened upon itself around the suture. Of course, the face 24 of the fence 20 is disposed parallel to the incision rather than perpendicular thereto, as shown, since the needle holder 14 is pivotable in a plane parallel to the axis of the body 10.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A surgical suturing instrument including an elongate body having a transverse opening at one end thereof, needle extracting means detachably mounted on one side of the body adjacent its opening and having a tubular portion extending through and beyond the opening so that its outer end projects from the opposite side of said body, the tubular portion being adapted to receive a surgical needle and its projecting end being adapted to support the pre-tied knot of a suture on which the needle is threaded, means adjacent said opening for confining the knot on the projecting end of said tubular portion, the needle extracting means having means coacting with said tubular portion for holding the needle, and means extending longitudinally of said body for releasing said needle extracting means therefrom and withdrawing said tubular portion from said opening whereby the needle and suture are pulled through the knot and opening and the knot is stripped from said projecting end of said tubular portion, the knot confining means having an aperture complementary to the suture for receiving the suture adjacent the knot to permit tightening of the knot upon pulling of the suture through the aperture.

2. A surgical suturing instrument as set forth in claim 1 including latch means detachably fastening the needle extracting means to the body and having connection with the releasing means for actuation thereby.

3. A surgical suturing instrument as set forth in claim 1 wherein the releasing means includes a rod extending longitudinally of the body, and latch means pivotally connecting the rod to the needle extracting means and detachably fastening the latter means to said body.

4. A surgical suturing instrument as set forth in claim 1 wherein the knot confining means is pivotally mounted on the body for movement into and out of coacting relation to the projecting end of the tubular portion of the needle extracting means.

5. A surgical suturing instrument as set forth in claim 4 wherein the knot confining means includes a face adjacent its aperture for engagement by the knot upon pulling of the suture through the aperture to tighten the knot.

6. A surgical suturing instrument as set forth in claim 1 including means pivotally mounted on the body for supporting the needle for movement into the tubular portion of the needle extracting means, and actuating means having connection with the needle supporting means and extending longitudinally of said body.

7. A surgical suturing instrument as set forth in claim 6 wherein the needle supporting means is pivotable about an axis transverse to the longitudinal axis of the body.

8. A surgical suturing instrument as set forth in claim 6 wherein the needle supporting means is pivotable about the longitudinal axis of the body.

9. A surgical suturing instrument as set forth in claim 6 wherein the needle supporting means has a recess for receiving the needle, and a latch element pivotally mounted on said supporting means for frictionally engaging the needle to hold the same in the recess, the body having a pair of spaced stops for engagement by the latch element whereby said element is pivoted into engagement with the needle upon pivoting of said supporting means away from the needle extracting means and is pivoted out of engagement with the needle upon pivoting of said supporting means toward said extracting means.

10. A surgical suturing instrument as set forth in claim 6 wherein the needle supporting means has a recess for receiving the needle, and a latch element pivotally mounted on said supporting means for frictionally engaging the needle to hold the same in the recess, the body having a stop engageable by the latch element upon pivoting of said supporting means toward the needle extracting means to pivot said element out of engagement with the needle.

11. A surgical suturing instrument including an elongate body having a transverse opening at one end thereof, a needle extractor detachably mounted on the body adjacent its opening, a needle receiving tube extending from the extractor through and beyond the opening so as to have an end projecting from said body, the projecting end of the tube being adapted to support the pre-tied knot of a suture on one end of which a surgical needle is threaded, a knot retainer movably mounted on said body for movement into and out of coacting relation to said tube end and overlying relation to the knot for confining the knot thereon, the needle extractor having means coacting with said tube for holding a needle inserted through said tube, and an actuating rod extending longitudinally of said body and having connection with said extractor for detaching said extractor from said body and withdrawing said tube from said opening to strip the knot from said projecting end and draw the needle and suture through the knot and opening, the knot retainer having an aperture complementary to the suture for receiving the free end of the suture and preventing the passage of the knot therethrough whereby the knot is tightened upon pulling of the suture through the aperture.

12. A surgical suturing instrument as set forth in claim 11 including a latch pivotally connecting the needle extractor to the actuating rod and detachably fastening said extractor to the body.

13. A surgical suturing instrument as set forth in claim 11 wherein the actuating rod extends to the end of the body opposite its opening, and means detachably fastening said rod to the opposite end of said body.

14. A surgical suturing instrument as set forth in claim 11 including a needle holder pivotally mounted on the body, and an actuating member extending longitudinally of said body and having connection with the holder for pivoting said holder to move the needle into the tube.

15. A surgical suturing instrument as set forth in claim 14 wherein the needle holder is pivotable about an axis transverse to the longitudinal axis of the body, the actuating member having pivotal connection with said holder and being reciprocable.

16. A surgical suturing instrument as set forth in claim 14 wherein the needle holder is pivotable about the longitudinal axis of the body and the actuating member is rotatable about said axis.

17. A surgical suturing instrument as set forth in claim 14 wherein the needle holder has a recess for receiving the needle, and a latch movably mounted on said holder for frictionally engaging the needle to releasably confine the same in the recess.

18. A surgical suturing instrument including an elongate body, a holder for a surgical needle pivotally mounted on one end of the body and having a receiver for a surgical needle, an actuating member extending longitudinally of said body and having connection with the holder for imparting pivotal movement thereto, and a latch pivotally mounted on said holder for frictionally engaging the needle to confine the same in the receiver, said body having a stop engageable by the latch to pivot said latch out of engagement with the needle upon pivotal movement of said holder toward the stop.

19. A surgical suturing instrument including an elongate body, a holder for a surgical needle pivotally mounted on one end of the body and having a receiver for a surgical needle, an actuating member extending longitudinally of said body and having connection with the holder for imparting pivotal movement thereto, and a latch pivotally mounted on said holder for frictionally engaging the needle to confine the same in the receiver, said body having a pair of spaced stops engageable by the latch to pivot said latch into engagement with the needle upon pivotal movement of said holder in one direction and out of engagement with the needle upon pivotal movement of said holder in the opposite direction.

20. As a sub-combination in a surgical suturing instrument a pre-tied suture knot having a pair of loops for engaging around a support, the first loop having a free leg and a leg common to one of the legs of the second loop, said second loop having a second leg looped over and under the common and free legs and then over itself, the second leg then being looped under and over both legs of said first loop and then under itself.

No references cited.